United States Patent
Kwon et al.

(10) Patent No.: US 11,940,716 B2
(45) Date of Patent: Mar. 26, 2024

(54) CAMERA MODULE

(71) Applicant: SAMSUNG ELECTRO-MECHANICS CO., LTD., Suwon-si (KR)

(72) Inventors: Young Hwan Kwon, Suwon-si (KR); Ik Jin Jang, Suwon-si (KR); Chuel Jin Park, Suwon-si (KR); Se Houn Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 431 days.

(21) Appl. No.: 17/216,026

(22) Filed: Mar. 29, 2021

(65) Prior Publication Data

US 2022/0146912 A1 May 12, 2022

(30) Foreign Application Priority Data

Nov. 12, 2020 (KR) .......................... 10-2020-0150881

(51) Int. Cl.
*G03B 17/17* (2021.01)
*G02B 7/18* (2021.01)
(Continued)

(52) U.S. Cl.
CPC .......... *G03B 17/17* (2013.01); *G02B 7/1805* (2013.01); *G02B 13/0065* (2013.01); *H04N 23/55* (2023.01); *G03B 2205/0007* (2013.01); *G03B 2205/0046* (2013.01); *G03B 2205/0069* (2013.01)

(58) Field of Classification Search
CPC ............ G03B 17/17; G03B 2205/0007; F02B 7/1805; G02B 7/1805
See application file for complete search history.

(56) References Cited

U.S. PATENT DOCUMENTS 10,921,552 B1 * 2/2021 Park ...................... G02B 7/182
2015/0373272 A1 12/2015 Lim et al.
(Continued)

FOREIGN PATENT DOCUMENTS

JP    2006-171449 A    6/2006
KR   10-2015-0145682 A   12/2015
(Continued)

OTHER PUBLICATIONS

Korean Office Action dated Mar. 14, 2022 in corresponding Korean Patent Application No. 10-2020-0150881 (6 pages in English and 5 pages in Korean).

*Primary Examiner* — Christopher E Mahoney
(74) *Attorney, Agent, or Firm* — NSIP Law

(57) ABSTRACT

A camera module includes: a first lens module disposed in a housing; and a reflective module. The reflective module includes: a reflective member including at least two reflective surfaces disposed at different angles and configured to reflect light passing through the first lens module; and a carrier disposed between the reflective member and the housing. The camera module further includes an image sensor configured to collect light reflected from the reflective module. The reflective member is configured to move in a first direction with respect to the carrier, and the carrier is configured to move in a second direction perpendicular to the first direction with respect to the housing.

20 Claims, 8 Drawing Sheets

(51) Int. Cl.
    *G02B 13/00*     (2006.01)
    *H04N 23/55*     (2023.01)

(56) References Cited

U.S. PATENT DOCUMENTS

2018/0364450 A1    12/2018   Lee et al.
2021/0208487 A1*   7/2021   Cho .................. G02B 26/0833
2022/0357567 A1*   11/2022   Zhao ..................... G02B 23/08

FOREIGN PATENT DOCUMENTS

| KR | 10-2018-0137278 A | 12/2018 |
| KR | 10-2078978 B1 | 2/2020 |
| KR | 10-2090625 B1 | 3/2020 |
| KR | 102334584 B1 * | 12/2021 |

\* cited by examiner

CAMERA MODULE

CROSS-REFERENCE TO RELATED APPLICATIONS

This application claims the benefit under 35 U.S.C § 119(a) of Korean Patent Application No. 10-2020-0150881 filed on Nov. 12, 2020 in the Korean Intellectual Property Office, the entire disclosure of which is incorporated herein by reference for all purposes.

BACKGROUND

1. Field

The following description relates to a camera module, for example, a camera module including a reflective member for changing an optical path.

2. Description of Related Art

A camera module provided in a mobile device has been manufactured to have performance comparable to that of a general camera. For example, since a mobile device has been frequently used for photography, demand for a camera module providing a high zoom magnification has been increased.

To increase a zoom magnification, a distance by which light incident to a camera moves to an image sensor, a total length or a total track length (TTL), may need to increase, and to implement a relatively long total track length, a length of a camera may increase. Accordingly, recent camera modules have implemented a relatively long total track length by changing a path of light entering from a rear surface of a mobile device by about 90 degrees using a reflector such as a prism. To increase a zoom magnification in a camera module including a reflector, however, a total track length of a camera may increase such that a length of a camera module may increase.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes: a first lens module disposed in a housing; and a reflective module. The reflective module includes: a reflective member including at least two reflective surfaces disposed at different angles and configured to reflect light passing through the first lens module; and a carrier disposed between the reflective member and the housing. The cameral module further includes an image sensor configured to collect light reflected from the reflective module. The reflective member is configured to move in a first direction with respect to the carrier, and the carrier is configured to move in a second direction perpendicular to the first direction with respect to the housing.

The at least two reflective surfaces may include a first reflective surface and a second reflective surface forming a 90-degree angle with the first reflective surface. The light passing through the first lens module may be sequentially reflected from the first reflective surface and the second reflective surface, and may be incident to the image sensor.

The second reflective surface may form a 45-degree angle with an imaging surface of the image sensor.

The first direction may be parallel to an optical axis of the first lens module.

The second direction may be perpendicular to the optical axis of the first lens module.

The camera module may further include a ball member disposed between the carrier and the reflective member. Either one or both of the carrier and the reflective member may include a groove extending in the first direction and partially accommodating the ball member in portions opposing each other.

The camera module may further include: a first magnet disposed on one side of the reflective member; and a first yoke disposed in the housing to oppose the first magnet. The ball member may maintain contact with each of the carrier and the reflective member by magnetic attractive force between the first magnet and the first yoke.

The camera module may further include a first coil opposing the first magnet.

The camera module may further include a ball member disposed between the carrier and the housing. Either one or both of the carrier and the housing may include a groove extending in the second direction and partially accommodating the ball member in portions opposing each other.

The camera module may further include: a second magnet disposed on one side of the carrier; and a second yoke disposed in the housing to oppose the second magnet. The ball member may maintain contact with each of the carrier and the housing by magnetic attractive force between the second magnet and the second yoke.

The camera module may further include a second coil opposing the second magnet.

The camera module may further include: a folded module including a second reflective member configured to reflect incident light to the first lens module.

The folded module may be configured to rotate around a rotation axis perpendicular to an optical axis of the first lens module.

Either one of the first direction and the second direction may be parallel to the optical axis of the first lens module, and the other one of the first direction and the second direction may be parallel to a rotation axis of the folded module.

The camera module may further include a second lens module disposed on an optical path from the reflective module to the image sensor, and configured to move in a section between the reflective module and the image sensor with respect to the housing.

In another general aspect, a camera module includes: a lens module disposed in a housing; a reflective module disposed in the housing to be movable in a first direction and a second direction intersecting the first direction, the reflective module including a reflective member including at least two reflective surfaces disposed at different angles and configured to reflect light passing through the lens module; ball members disposed between the reflective member and the housing, and supporting movement of the reflective member in the first direction and movement of the reflective member in the second direction; and an image sensor configured to collect light reflected from the reflective module.

The camera module may be configured to perform a focusing operation through movement of the reflective member in the first direction, and perform optical image stabilization through the movement of the carrier in the second direction.

In another general aspect, a camera module includes: a lens module disposed in a housing; a first reflective module including: a carrier disposed in the housing; and a reflective member disposed on the carrier, and including a first reflective surface configured to reflect light that has passed through the lens module, and a second reflective surface configured to reflect light reflected from the first reflective surface toward an image sensor. The reflective member is configured to move in a first direction with respect to the carrier, and move together with the carrier in a second direction perpendicular to the first direction with respect to the housing.

The first direction may be parallel to an optical axis of the lens module.

The camera module may further include: a first ball member disposed between the carrier and the reflective member, and configured to support movement of the reflective member with respect to the carrier; and a second ball member disposed between the housing and the carrier, and configured to support movement of the carrier with respect to the housing.

The camera module may further include a second reflective module configured to rotate about an axis parallel to the second direction, and reflect incident light toward the lens module.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
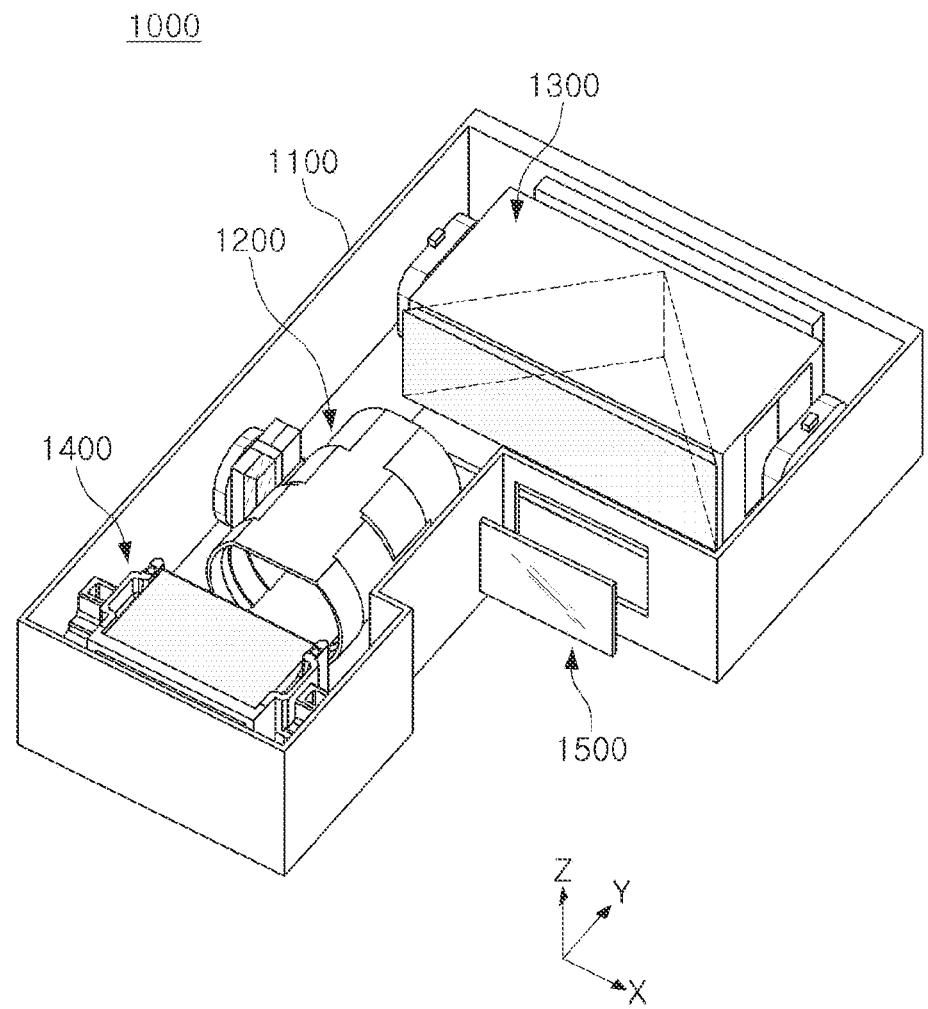
FIG. 1 is a perspective diagram illustrating an internal portion of a camera module, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed, as will be apparent after gaining an understanding of this disclosure, with the exception of operations necessarily occurring in a certain order. Also, descriptions of features known in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various ways as will be apparent after gaining an understanding of the disclosure of this application. Further, although the examples described herein have a variety of configurations, other configurations are possible as will be apparent after gaining an understanding of the disclosure of this application.

Figure 2:
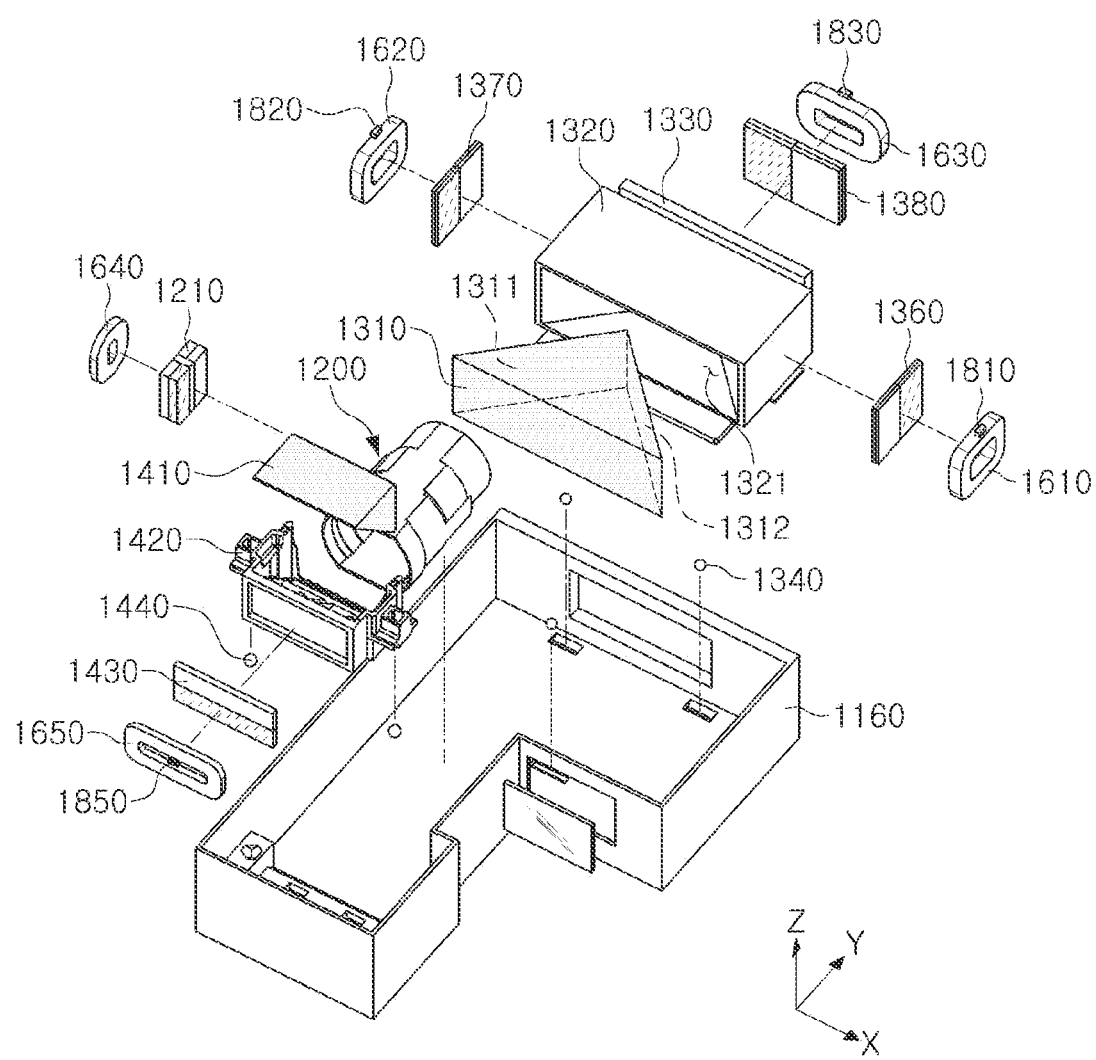
FIG. 2 is an exploded perspective diagram illustrating the camera module of FIG. 1.

FIG. 1 is a perspective diagram illustrating an internal portion of a camera module 1000, according to an embodiment. FIG. 2 is an exploded perspective diagram illustrating the camera module 1000.

Referring to FIGS. 1 and 2, the camera module 1000 may include, for example, a lens module 1200, a reflective module (or first reflective module) 1300, and an image sensor 1500.

In an embodiment, the lens module 1200 may include at least one lens in a barrel. In a case in which the barrel includes a plurality of lenses, the plurality of lenses may be arranged along an optical axis.

In an embodiment, the lens module 1200 may move in the optical axis direction (Y axis direction) with respect to the housing 1100. The camera module 1000 may include a driving unit (or driving assembly) for driving the lens module 1200. The driving unit may include a magnet 1210 and a coil 1640 disposed in the lens module 1200 and the housing 1100, respectively, and opposing each other. When a current flows in the coil 1640, an electromagnetic force may be generated between the magnet 1210 and the coil 1640, and the electromagnetic force may cause the lens module 1200 to move in the optical axis direction with respect to the housing 1100. The lens module 1200 may further include a structure accommodating the barrel, and the magnet 1210 may be mounted on the structure.

In an embodiment, the lens module 1200 may perform an autofocusing function together with the reflective module 1300. In another embodiment, the lens module 1200 may be fixed to the housing 1100. That is, the magnet 1210 and the coil 1640 disposed between the lens module 1200 and the housing 1100 in the illustrated embodiment, may not be provided in another embodiment. In this case, only the reflective module 1300 may perform an autofocusing function.

In an embodiment, the reflective module 1300 may include a first reflective member 1310 and a first holder 1320 accommodating the first reflective member 1310. The first reflective member 1310 may be fixed in an internal space 1321 of the first holder 1320 and may be configured to move integrally with the first holder 1320.

In an embodiment, the optical axis of the lens module 1200 may not coincide with a direction normal to an imaging surface of the image sensor 1500. A path of passing through the lens module 1200 may be changed through the reflective module 1300 and such that the light may be incident to the image sensor 1500. That is, the first reflective member 1310 may reflect light that has passed through the lens module 1200 towards the imaging surface of the image sensor 1500.

In an embodiment, the reflective module 1300 may reflect light passing through the lens module 1200 at least twice. In an embodiment, the first reflective member 1310 may include a first reflective surface 1311 and a second reflective surface 1312. Light passing through the lens module 1200 may first be reflected from the first reflective surface 1311 and may thereafter be reflected from the second reflective surface 1312.

In an embodiment, light moving from the lens module 1200 toward the first reflective member 1310 and light moving from the first reflective member 1310 toward the image sensor 1500 may be parallel to each other or may be almost parallel to each other. For example, the first and second reflective surfaces 1311 and 1312 may be configured such that a 90-degree angle or an angle approximate to 90 degrees is formed between the first and second reflective surfaces 1311 and 1312, and, in this case, light directed to the first reflective surface 1311 and light reflected from the second reflective surface 1312 may be parallel to each other or may be almost parallel to each other.

In an embodiment, the optical axis of the lens module 1200 and the direction a direction normal to the first reflective surface 1311 in which the first reflective surface 1311 is directed may form a 45-degree angle therebetween. In an embodiment, the imaging surface of the image sensor 1500 and the second reflective surface 1312 may form a 45-degree angle therebetween. Alternatively, the line normal to the imaging surface of the image sensor 1500 and the line normal to the second reflective surface 1312 may form a 45-degree angle therebetween.

In an embodiment, the reflective module 1300 may be configured to move with respect to the housing 1100. The reflective module 1300 may move in a direction (the Y-axis direction) parallel to the optical axis of the lens module 1200 with respect to the housing 1100. Also, the reflective module 1300 may move in a direction perpendicular to the optical axis (X axis direction) with respect to the housing 1100.

The movement of the reflective module 1300 with respect to the housing 1100 may be used for an autofocusing function and/or an optical image stabilization function. In an embodiment, the distance from the reflective module 1300 to the lens module 1200 (or the image sensor 1500) may change according to the movement of the reflective module 1300 in the direction parallel to the optical axis of the lens module 1200, and the movement of the reflective module 1300 in the direction parallel to the optical axis of the lens module 1200 may adjust a focus. In an embodiment, an image formed on the image sensor 1500 may be shifted according to the movement of the reflective module 1300 in the direction perpendicular to the optical axis of the lens module 1200, and such shifting of the image may be used for optical image stabilization.

In an embodiment, the reflective module 1300 may move in two directions intersecting each other. In an embodiment, the reflective module 1300 may move in a first direction parallel to the optical axis of the lens module 1200 and a second direction perpendicular to the optical axis. In the described embodiment, the optical axis of the lens module 1200 refers to a direction in which lenses of the lens module 1200 are sequentially arranged.

Figure 3:
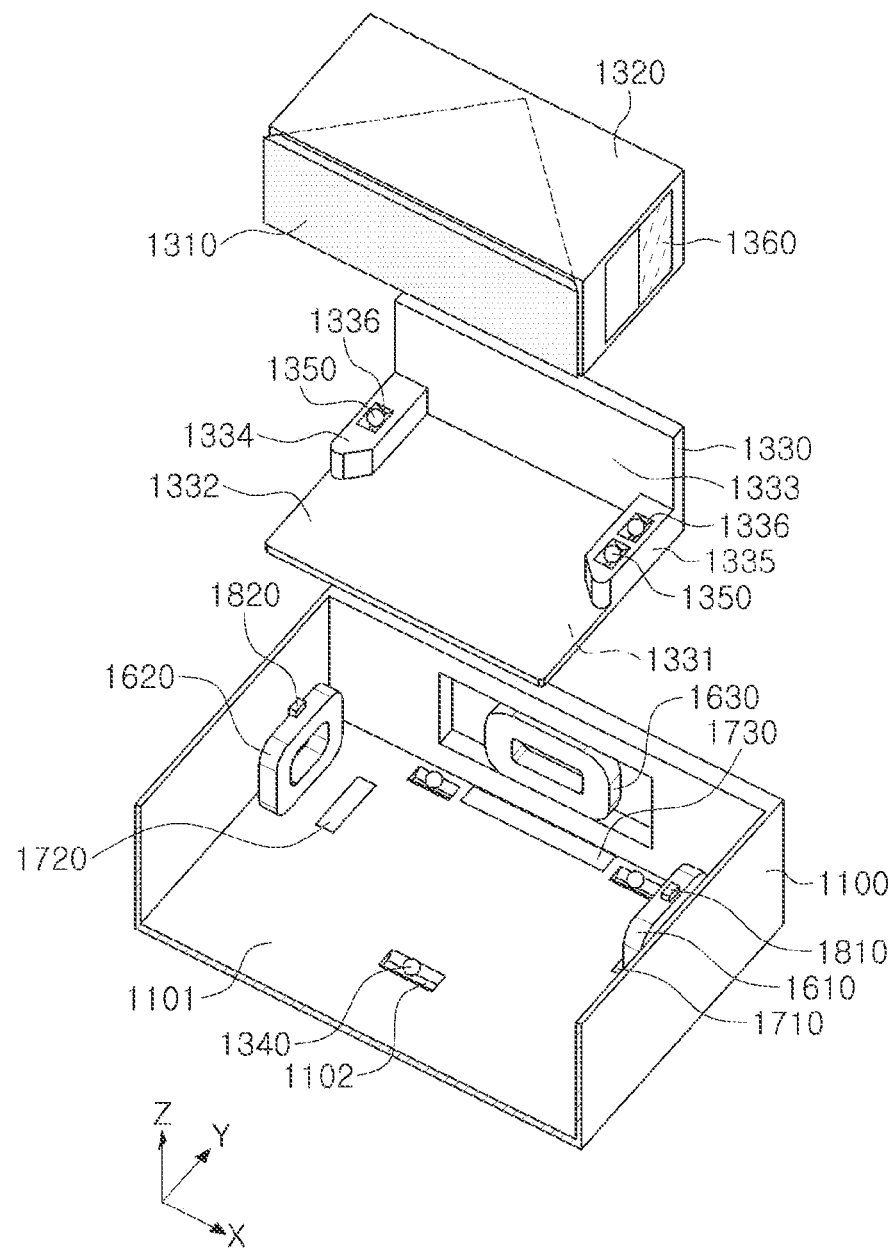
FIG. 3 is an exploded perspective diagram illustrating a reflective module, according to an embodiment.
Figure 4:
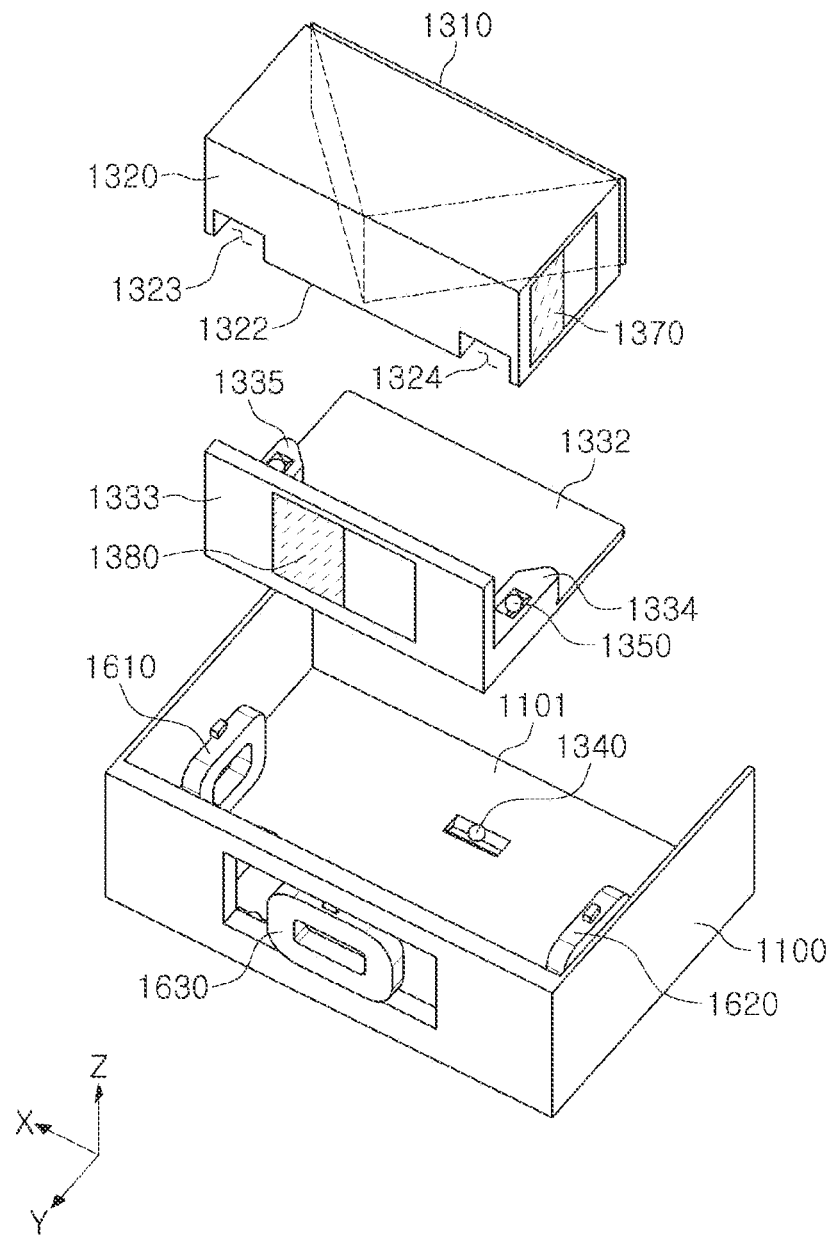
FIG. 4 is an exploded perspective diagram illustrating the reflective module viewed from another angle, according to an embodiment.
Figure 5:
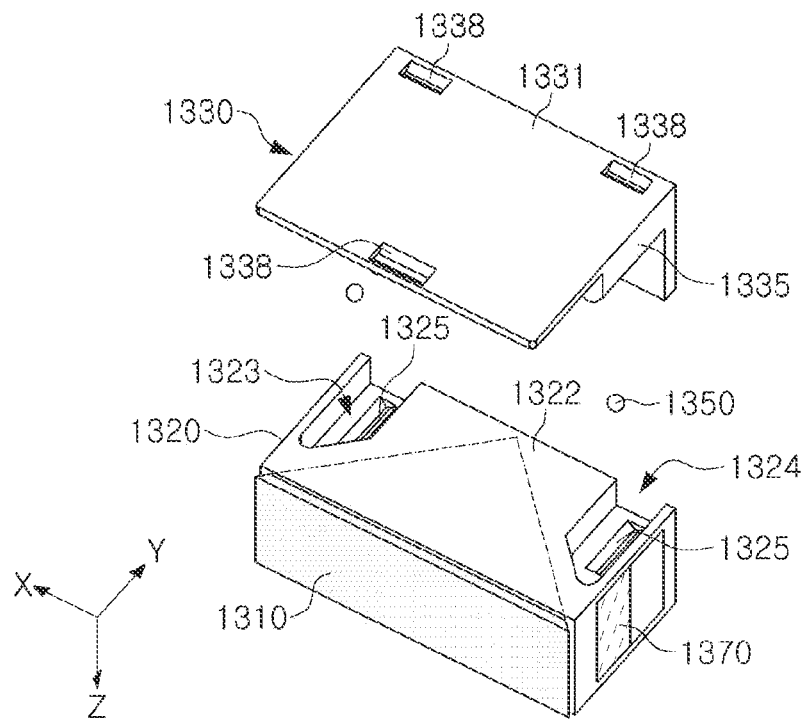
FIG. 5 is a diagram illustrating a lower portion of the reflective module, according to an embodiment.
Figure 6:
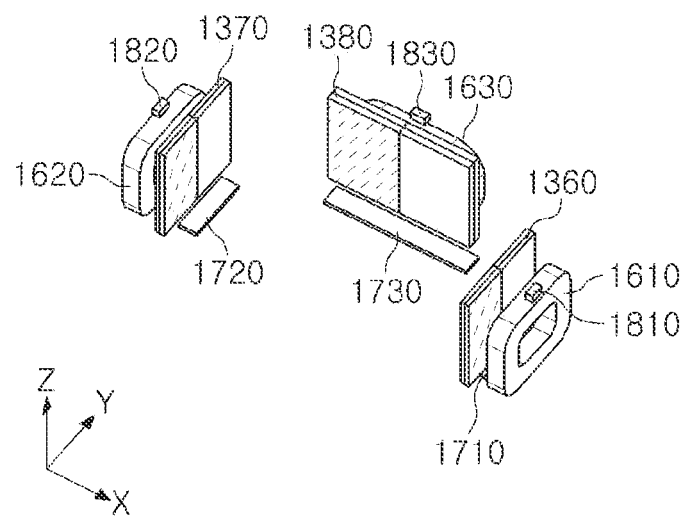
FIG. 6 is a diagram illustrating a driving unit of the reflective module, according to an embodiment.

FIGS. 3 to 6 illustrate a driving unit of the reflective module 1300, according to an embodiment. FIG. 3 is an exploded perspective diagram illustrating the reflective module 1300. FIG. 4 is an exploded perspective diagram illustrating the reflective module 1300, viewed from another angle. FIG. 5 is a diagram illustrating a lower portion of a reflective module 1300, according to an embodiment. FIG. 6 is a diagram illustrating the driving unit of the reflective module 1300, according to an embodiment.

Referring to FIGS. 3 to 5, the reflective module 1300 may include a carrier 1330 disposed between the first reflective member 1310 and the housing 1100 in an embodiment. In an embodiment, the carrier 1330 may be disposed on a bottom surface 1101 of the housing 1100 and the first reflective member 1310 may be provided on the carrier 1330.

As described above, the reflective module 1300 may include the first holder 1320 accommodating the first reflective member 1310. For example, the first holder 1320 to which the first reflective member 1310 is coupled may be provided on the carrier 1330. As another example, a magnet 1370 (FIG. 5) disposed on one side of the first reflective member 1310 may be disposed on one side of the first holder 1320. As another example, a guide groove 1325 (FIG. 5) disposed on one side of the first reflective member 1310 may be provided in one side of the first holder 1320.

In an embodiment, the carrier 1330 may be configured to move in different directions with respect to the reflective module 1300 and the housing 1100. For example, the carrier 1330 may be configured to move in a first direction with respect to the housing 1100 and move in a second direction intersecting the first direction with respect to the first reflective member 1310. Accordingly, the first reflective member 1310 may move in a first direction and a second direction with respect to the housing 1100.

In an embodiment, the first reflective member 1310 may move in a first direction parallel to the optical axis with respect to the carrier 1330. In an embodiment, the carrier 1330 may move in a second direction perpendicular to the optical axis with respect to the housing 1100. The movement of the first reflective member 1310 or the reflective module 1300 in the first direction may be the movement in a direction parallel to the optical axis. Also, the movement of the first reflective member 1310 or the reflective module 1300 in the second direction may be the movement in the direction perpendicular to the optical axis.

In an embodiment, the relative movement among the first reflective member 1310, the carrier 1330, and the housing 1100 may be guided by ball members 1340 and 1350.

The first holder 1320 may move in a direction parallel to the optical axis with respect to the carrier 1330. In an embodiment, the ball member 1350 may be disposed between the first holder 1320 and the carrier 1330, and may support the movement of the first holder 1320 with respect to the carrier 1330.

Referring to FIGS. 3 and 5, in an embodiment, either one or both of the first holder 1320 and the carrier 1330 may respectively include guide grooves 1325 and 1336, or vice-versa, configured to accommodate at least a portion of the ball member 1350 in portions opposing each other. The moving direction of the first holder 1320 may be limited to a direction parallel to the optical axis by the guide grooves 1325 and 1336. Alternatively, only the guide grooves 1325 or only the guide grooves 1336 may be provided in the first holder 1320 or the carrier 1330.

In an embodiment, the carrier 1330 may include protrusions 1334 and 1335 extending towards the first holder 1320 from respective sides of a base 1332. Recesses 1323 and 1324 for partially accommodating the protrusions 1334 and 1335, respectively, may be disposed on a lower surface 1322 of the first holder 1320, on respective sides of the first holder 1320.

The ball member 1350 may be disposed between the protrusions 1334 and 1335 of the carrier 1330 and the recesses 1323 and 1324 of the first holder 1320. Each of the protrusions 1334 and 1335 may include a guide groove 1336 for accommodating a respective ball member 1350. The protrusion 1335 on one side of the base 1332 may accommodate two ball members 1350 and may include two guide grooves 1336 for partially accommodating the ball members 1350, respectively. The guide grooves 1336 may extend in a direction parallel to the optical axis.

In an embodiment, the first holder 1320 may include the guide groove 1325 for partially accommodating a respective ball member 1350 and extending in a direction parallel to the optical axis. Referring to FIG. 5, a guide groove 1325 may be provided on the bottom surface of each of the recesses 1323 and 1324.

The guide grooves 1325 and 1336 may extend in a direction parallel to the optical axis (the Y direction), and the ball member 1350 may move in the extending direction of the guide grooves 1325 and 1336. Accordingly, the movement of the first reflective member 1310 (or the first holder 1320) with respect to the carrier 1330 may be limited in a direction parallel to the optical axis.

In an embodiment, the carrier 1330 may move in a direction perpendicular to the optical axis with respect to the housing 1100. In an embodiment, the ball member 1340 disposed between the housing 1100 and the carrier 1330 may support the movement of the carrier 1330 with respect to the housing 1100.

In an embodiment, the housing 1100 and the carrier 1330 may respectively include guide grooves 1102 and 1338, or vice-versa, configured to respectively accommodate at least a portion of respective ball members 1340 in portions opposing each other. Alternatively, only the guide grooves 1102 or only the guide grooves 1338) may be provided in the housing 1100 or the carrier 1330. The moving direction of the carrier 1330 may be limited to a direction perpendicular to the optical axis by the guide grooves 1102 and 1338.

In an embodiment, the bottom surface 1101 of the housing 1100 and the lower surface 1331 of the carrier 1330 may oppose each other, and guide grooves 1102 and 1338 partially accommodating a respective ball member 1340 may be included. The guide grooves 1102 and 1338 may extend in a direction perpendicular to the optical axis, and the movement of the carrier 1330 with respect to the housing 1100 may be limited in a direction perpendicular to the optical axis.

Although not illustrated, additionally or alternatively, the ball member 1340 may be fixed to the first holder 1320, the carrier 1330, or the housing 1100, or may be replaced with an integrally formed protrusion. For example, a protrusion protruding from the lower surface 1322 of the first holder 1320 toward the carrier 1330 may be partially accommodated in the guide groove 1336 of the carrier 1330, and may guide the movement of the first holder 1320 with respect to the carrier 1330. As another example, a protrusion protruding from the lower surface 1331 of the carrier 1330 toward the housing 1100 may be partially accommodated in the guide groove 1102 of the housing 1100, and may guide the movement of the carrier 1330 with respect to the housing 1100.

The camera module 1000 may include a driving unit (or driving assembly) configured to move the first reflective member 1310 with respect to the housing 1100. The driving unit may include a first driving unit (or first driving assembly) configured to move the first reflective member 1310 in a direction parallel to the optical axis and a second driving unit (or second driving assembly) configured to move the first reflective member 1310 in a direction perpendicular to the optical axis.

When the reflective member 1310 moves in a direction parallel to the optical axis, a focal length may be adjusted.

Thus, the first driving unit may be referred to as an autofocusing (AF) driving unit. Also, when the first reflective member 1310 moves in a direction perpendicular to the optical axis, the shaking of the camera module 1000 with respect to a subject may be compensated for, and thus, the first driving unit may be referred to as an optical image stabilization (OIS) driving unit.

In an embodiment, the first driving unit may include magnets 1360 and 1370 fixed to the first holder 1320 and coils 1610 and 1620 fixed to the housing 1100. For example, two magnets 1360 and 1370 may be respectively provided on both sides of the first holder 1320, and two coils 1610 and 1620 opposing the magnets, respectively, may be provided in the housing 1100. In an embodiment, the magnets 1360 and 1370 and the coils 1610 and 1620 may oppose each other, respectively, in a direction perpendicular to the optical axis (or the X axis direction). In an embodiment, the first driving unit may further include sensors 1810 and 1820 for sensing the position of the first reflecting member 1310, to control the movement of the first reflecting member 1310 in the optical axis direction.

In an embodiment, the second driving unit may include a magnet 1380 fixed to the carrier 1330 and a coil 1630 fixed to the housing 1100. The carrier 1330 may include a sidewall 1333 extending from the base 1332 in the Z-axis direction, and a magnet 1380 may be mounted on the sidewall 1333. In an embodiment, the magnet 1380 and the coil 1630 may oppose each other in a direction parallel to the optical axis (or in the Y-axis direction). In an embodiment, the second driving unit may further include a sensor 1830 for sensing a position of the first reflective member 1310 to control the movement of the first reflective member 1310 in a direction perpendicular to the optical axis.

The magnets 1360, 1370, and 1380 and the coils 1610, 1620, and 1630 may be disposed to oppose each other in the first driving unit and the second driving unit, and when current flows in the coils 1610, 1620, and 1630, electromagnetic force may be formed between the elements. The first reflective member 1310 may move with respect to the housing 1100 according to interaction between the coils 1610, 1620, and 1630 and the magnets 1360, 1370, and 1380.

For image quality, when the first reflective member 1310 moves with respect to the housing 1100, the first reflective member 1310 should not be shaken in the Z-axis direction. In other words, when the first holder 1320 moves with respect to the carrier 1330, the ball member 1340 disposed between the first holder 1320 and the carrier 1330 may need to maintain a state of contact with the guide grooves 1325 and 1336. Also, when the carrier 1330 moves with respect to the housing 1100, the ball member 1340 disposed between the carrier 1330 and the housing 1100 may need to maintain a state of contact with the guide grooves 1102 and 1338.

In an embodiment, yokes 1710, 1720, and 1730 may be provided in the housing 1100 to prevent the first reflective member 1310 from shaking in the Z-axis direction. The yokes 1710, 1720, and 1730 may be provided in positions corresponding to the magnets 1360, 1370, and 1380 disposed in the first holder 1320 and the carrier 1330. The magnets 1360, 1370, and 1380 and the yokes 1710, 1720, and 1730 corresponding to the magnets may be disposed to oppose each other, respectively, in the Z-axis direction. By magnetic attractive force working between the magnets 1360, 1370, and 1380 and the yokes 1710, 1720, and 1730, respectively, the yokes 1710, 1720, and 1730 may draw the magnets 1360, 1370, and 1380, respectively, in the Z-axis direction. Accordingly, the ball members 1340 and 1350 may maintain a state of contact with the guide grooves 1102 and 1338, and the guide grooves 1336 and 1325, respectively.

In the illustrated embodiment, the magnets 1360, 1370, and 1380 used to drive the first reflective member 1310 may also be configured to allow the reflective module 1300 to be maintained in close contact with the bottom surface 1101 of the housing 1100. In another embodiment, a separate magnet may be provided in the reflective module 1300 and may provide a force to allow the reflective module 1300 to be maintained in close contact with the bottom surface 1101 of the housing 1100. In this case, the yokes 1710, 1720, and 1730 may be provided in positions opposing the separate magnet, rather than the driving magnets 1360, 1370, and 1380, in the Z-axis direction.

In an embodiment, the camera module 1000 may further include a folded module 1400 (or a second reflective module). In an embodiment, the folded module 1400 may include a second reflecting member 1410 and a second holder 1420 accommodating the second reflecting member 1410. The second reflective member 1410 may be configured to change a path of light incident to one side such that the light is directed toward the lens module 1200. For example, light reflected by the second reflective member 1410 may travel in a direction parallel to the optical axis or almost parallel to the optical axis.

In an embodiment, the folded module 1400 may rotate with reference to an axis perpendicular to the optical axis (e.g., an axis parallel to the X axis) of the lens module 1200. When the camera module 1000 is shaken with respect to a subject, the shaking may be compensated for by rotating the folded module 1400, and a stable image may thereby be formed on the image sensor 1500.

In an embodiment, a magnet 1430 may be mounted on the second holder 1420, and the magnet 1430 may oppose the coil 1650 provided in the housing 1100. The folded module 1400 may rotate with respect to the housing 1100 due to interaction between the coil 1650 and the magnet 1430. While the second holder 1420 rotates with respect to the housing 1100, a ball member 1440 disposed between the second holder 1420 and the housing 1100 may support the second holder 1420. That is, the ball member 1440 may support rotation of the second holder 1420 with respect to the housing 1100. For example, two ball members 1440 may be disposed on both sides of the second holder 1420 and may be spaced apart from each other in the X-axis direction, and an axis extending through the two ball members 1440 may define a rotation axis of the second holder 1420.

In an embodiment, the first reflective member 1310 may move in a first direction parallel to the optical axis (Y direction) and a second direction perpendicular to the first direction (X direction). Also, the second reflective member 1410 may rotate with respect to the housing 1100 with reference to an axis parallel to the second direction.

Referring to FIG. 1, the camera module 1000 may collect light incident to the folded module 1400 in the −Z direction. When the camera module 1000 is shaken on an X-Y plane, an image formed on the image sensor 1500 may be shaken on the X-Z plane. Accordingly, the image may be shaken in two directions, in the X direction and the Z direction.

In an embodiment, the folded module 1400 and the reflective module 1300 may address the shaking in two directions, respectively. The folded module 1400 may address the shaking of the image in the Z direction, and the reflective module 1300 may address the shaking of the image in the X direction. The shaking of the image in the X direction on the image sensor 1500 may be compensated for by the movement of the reflective module 1300 in the X direction. The shaking of the image in the Z direction on the image sensor 1500 may be compensated for by rotation about an axis of the folded module 1400 parallel to the X axis.

Since the folded module 1400 and the reflective module 1300 address the shaking of the image in two directions, the quality of an image obtained when the optical image stabilization function operates may improve. Differently from the embodiment described herein, in a configuration in which the second reflective member 1410 addresses both the shakings of the image in the two directions, a rotation blurring phenomenon may occur in the image. When the folded module 1400 rotates about an axis perpendicular to the Z axis, an image formed on the image sensor 1500 may move in the X axis direction. In this case, a phenomenon in which the image is distorted as a portion of the image rotates is known as rotation blurring. In an embodiment described herein, the reflective module 1300 may address the shaking of the image in the X-axis direction, which may prevent or reduce the rotation blurring issue.

Figure 7:
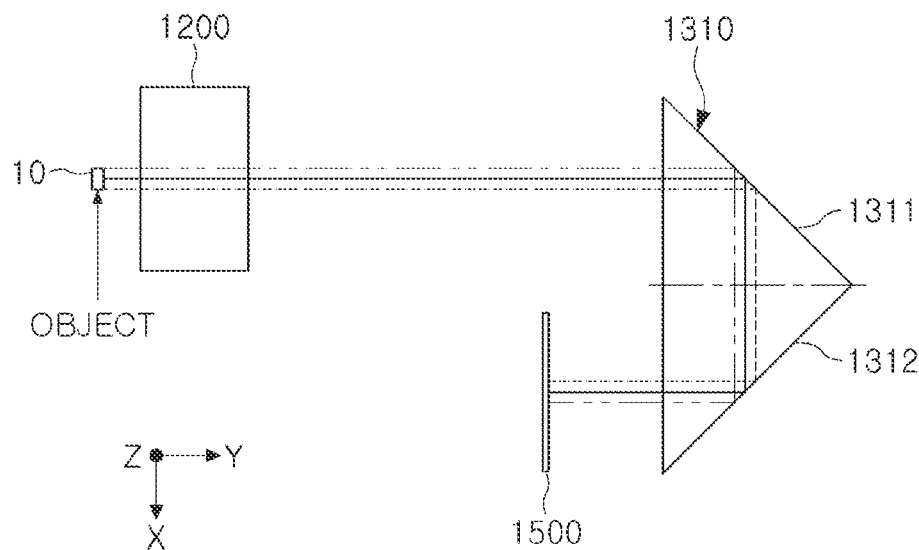
FIG. 7 is a diagram illustrating an optical path between a lens module and an image sensor, according to an embodiment.
Figure 8:
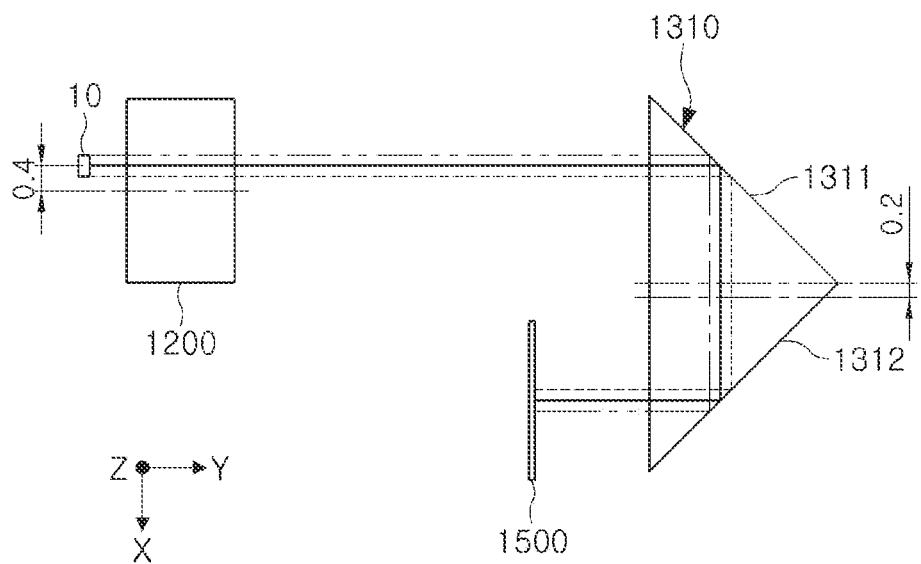
FIG. 8 is a diagram illustrating an optical path between the lens module and the image sensor when an image stabilization function is performed, according to an embodiment.
Figure 9:
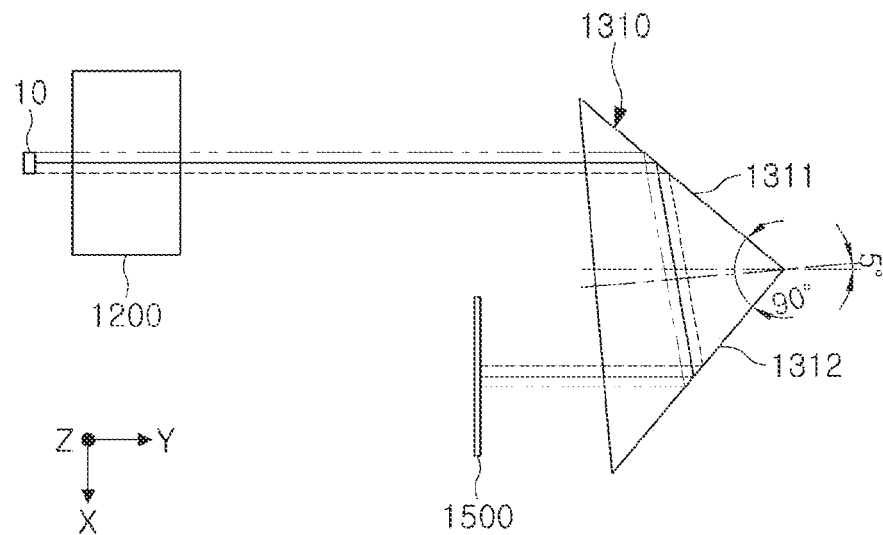
FIG. 9 is a diagram illustrating an optical path between the lens module and the image sensor when a first reflective member tilts, according to an embodiment.
Figure 10:
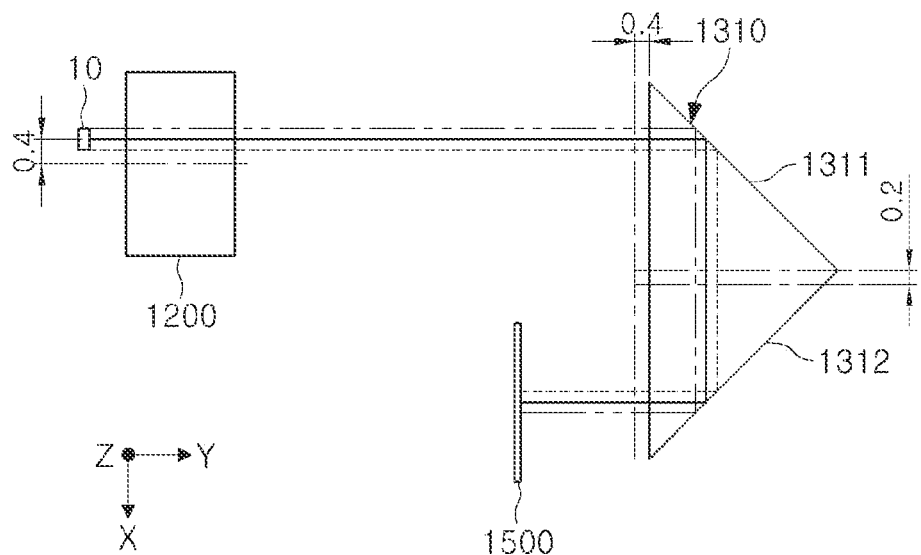
FIG. 10 is a diagram illustrating an optical path between the lens module and the image sensor when an autofocusing function is performed, according to an embodiment.

FIG. 7 is a diagram illustrating an optical path between the lens module 1200 and the image sensor 1500. FIG. 8 is a diagram illustrating an optical path between the lens module 1200 and the image sensor 1500 when an image stabilization function is performed, according to an embodiment. FIG. 9 is a diagram illustrating an optical path between the lens module 1200 and an image sensor 1500 when the first reflective member 1310, tilts according to an embodiment. FIG. 10 is a diagram illustrating an optical path between the lens module 1200 and the image sensor 1500 when an autofocusing function is performed, according to an embodiment.

In an embodiment, when the first reflective member 1310 moves linearly, a required optical effect may be reduced to ½. For example, when the required amount of movement of the lens module 1200 for an autofocusing function is 1 mm, the required movement of the first reflective member 1310 may only be 0.5 mm. As another example, when the lens module 1200 needs to move by 0.4 mm in the X direction to compensate for the shaking, the same effect may be obtained even when the first reflective member 1310 moves only by 0.2 mm in the X direction. The optical effect according to the movement of the first reflective member 1310 will be described in greater detail with reference to FIGS. 7 to 10.

Referring to FIGS. 7 to 10, light may move from a subject 10 to the image sensor 1500 through the first reflective member 1310. Three rays departing from both ends and a center of the subject 10 are indicated by different lines.

The light path may be divided into three sections with reference to turning points. The optical path may be divided into a first section from the subject 10 to the first reflective surface 1311, a second section from the first reflective surface 1311 to the second reflective surface 1312, and a third section from the second reflective surface 1312 to the image sensor 1500.

FIG. 7 illustrates a state in which the optical axis of the camera module 1000 coincides with the center of the subject 10. Table 1 lists the moving distances and the total moving distances of the rays in FIG. 7 in each section.

TABLE 1

| Classification | First section | Second section | Third section | Total |
|---|---|---|---|---|
| Ray 1 (dash-double dotted line) | 9.800 | 4.352 | 4.800 | 18.952 |
| Ray 2 (solid line) | 10.000 | 3.952 | 5.000 | 18.952 |
| Ray 3 (dashed line) | 10.200 | 3.552 | 5.200 | 18.952 |

FIG. 8 illustrates a state in which the subject 10 in FIG. 7 moved by 0.4 mm in the +X direction, which indicates that the camera moved by 0.4 mm in the −X direction with respect to the subject 10. To form an image in the same position as in FIG. 7 on the image sensor 1500, the first reflective member 1310 may need to move in the X direction. In this case, when the first reflective member 1310 moves only by half mm of the displacement amount of the subject 10, the image may be formed in the same position as in FIG. 7. That is, even when the subject 10 moves by 0.4 mm in the +X direction with respect to the lens module 1200 in the state illustrated in FIG. 7, when the first reflective member 1310 moves only by 0.2 mm in the +X direction, the position of the image with respect to the image sensor 1500 may not change. Table 2 lists the moving distances and the total moving distances of the rays in FIG. 8 in each section.

TABLE 2

| Classification | First section | Second section | Third section | Total |
|---|---|---|---|---|
| Ray 1 (dash-double dotted line) | 9.600 | 4.752 | 4.600 | 18.952 |
| Ray 2 (solid line) | 9.800 | 4.352 | 4.800 | 18.952 |
| Ray 3 (dashed line) | 10.000 | 3.952 | 5.000 | 18.952 |

Comparing Table 1 with Table 2, the total moving distances of the three rays are 18.952 mm, which are the same. When the state changes from the state in FIG. 7 to the state in FIG. 8, the moving distance of the three rays increased by 0.4 mm in the second section, but the moving distance in the first and third sections decreased by 0.2 mm, such that the total moving distance does not change, which indicates that, even when the second reflective member 1410 moves in the X-axis direction, the focal length may be maintained to be constant.

FIG. 9 illustrates an optical path when the first reflective member 1310 is provided in a tilted state with respect to the Z axis. Table 3 lists the moving distances and the total moving distances of the rays in FIG. 9 in each section.

TABLE 3

| Classification | First section | Second section | Third section | Total |
|---|---|---|---|---|
| Ray 1 (dash-double dotted line) | 9.383 | 4.419 | 5.150 | 18.952 |
| Ray 2 (solid line) | 9.621 | 4.013 | 5.318 | 18.952 |
| Ray 3 (dashed line) | 9.859 | 3.607 | 5.486 | 18.952 |

Referring to FIG. 9 and Table 3, it has been indicated that, even when tilting occurs while assembling the first reflective member 1310 to the housing 1100, the total moving distance did not change. Also, the width between the rays in the first section and the third section was maintained to be constant. If the ray is reflected from a first reflective member having a single reflective surface, the width between the rays may change (for example, the widths between the rays in the first and second sections are different) before and after the reflection according to the assembly tilting, which may lead to deterioration of image quality. When the camera module 1000 includes the first reflective member 1310 having the two reflective surfaces 1311 and 1312 as described in the aforementioned embodiments, the gap between the rays (the rays in the first section) entering the first reflective member 1310 may coincide with the rays (the rays in the third section) discharged from the first reflective member 1310, which may contribute to improving image quality.

FIG. 10 illustrates a state in which the focal length is additionally adjusted in FIG. 8. As the first reflective member 1310 moves in the Y direction, the moving distance of the rays may change. Table 4 lists the moving distances and the total moving distances of the rays in FIG. 10 in each section.

TABLE 4

| Classification | First section | Second section | Third section | Total |
|---|---|---|---|---|
| Ray 1 (dash-double dotted line) | 10.000 | 4.752 | 5.000 | 19.752 |
| Ray 2 (solid line) | 10.200 | 4.352 | 5.200 | 19.752 |
| Ray 3 (dashed line) | 10.400 | 3.952 | 5.400 | 19.752 |

Comparing Table 4 with Table 2, when the first reflective member 1310 moved by 0.4 mm in the +Y direction, the moving distances of the rays in the second section were the same, and the moving distances of the rays in the first section and the third section increased by 0.4 mm. Accordingly, the total moving distances of the rays increased by 0.8 mm, which is twice 0.4 mm. Differently from the above example, when the first reflective member 1310 moved by 0.4 mm in the −Y direction, the moving distances of the rays may have decreased by 0.8 mm. The above example indicates that even when the driving distance of the first reflecting member 1310 is not long, the amount of adjustment of focal length may be relatively large. In the camera module 1000 providing a relatively high zoom magnification, since fluctuation of the focal length is relatively large, the lens module 1200 may need to move by a relatively long distance, which indicates that the length of the driving unit (e.g., the length of the driving magnet, the length of the guide groove for accommodating the ball member, etc.) may increase, and accordingly, the size of the camera module 1000 may increase. The camera module 1000 in the embodiment disclosed herein may include the first reflective member 1310 having the two reflective surfaces 1311 and 1312 for adjusting a focal length, thereby sufficiently securing the amount of adjustment of the focal length.

The numerical values in Tables 1 to 4 are merely example numerical values provided to describe the embodiments, and the embodiments are not limited to the numerical values in Tables 1 to 4.

Figure 11:
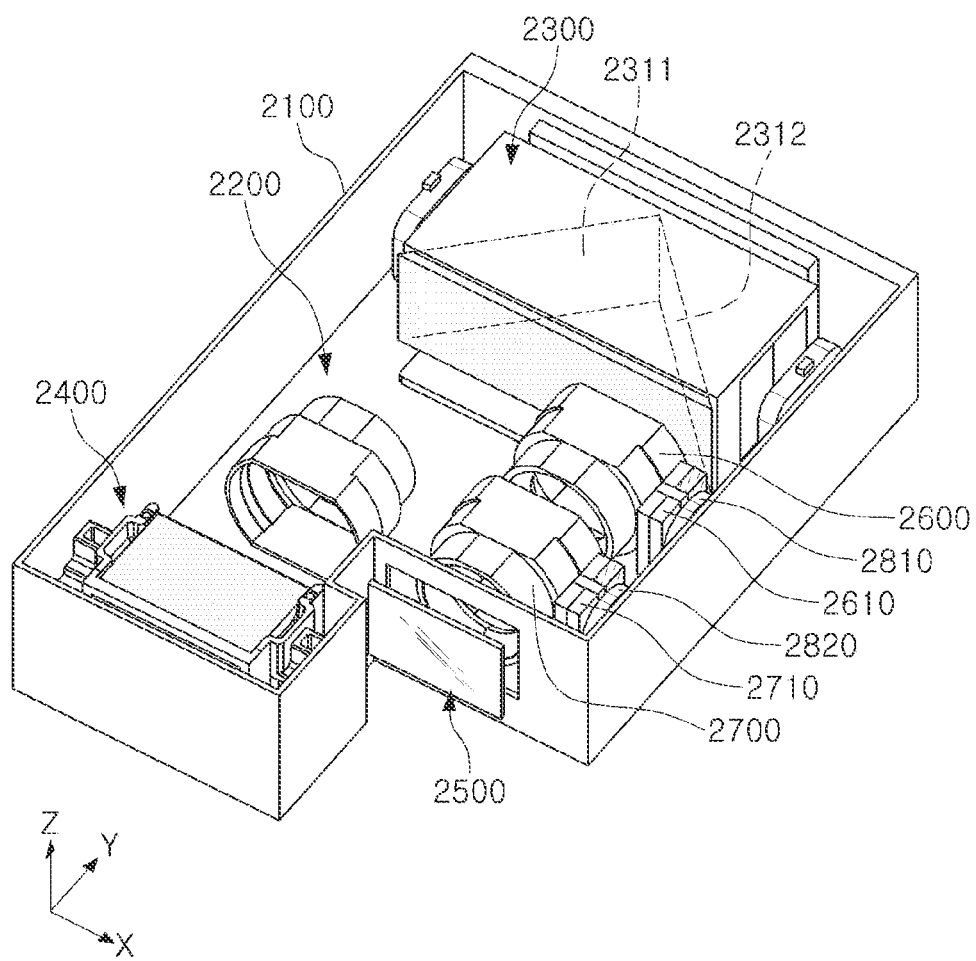
FIG. 11 is a diagram illustrating a camera module including a plurality of lenses, according to an embodiment.

FIG. 11 is a diagram illustrating a camera module 2000 including a reflective module 2300 and a plurality of lenses 2200, 2600, and 2700, according to an embodiment.

Referring to FIG. 11, the reflective module 2300 may include a first reflective surface 2311 and a second reflective surface 2312, and the camera module 2000 may include two or more lens modules, for example a first lens module 2200, a second lens module 2600, and a third lens module 2700. The first lens module 2200, the reflective module 2300, the image sensor 2500, and the folded module 2400 may be the same as or similar to the corresponding elements 1200, 1300, 1400, and 1500, respectively, of the camera module 1000 described with reference to FIGS. 1 to 6, and overlapping descriptions will not be repeated in describing the camera module 2000.

In an embodiment, the camera module 2000 may further include at least one lens module, for example, the second and third lens modules 2600 and 2700, disposed between the image sensor 2500 and the reflective module 2300. In an embodiment, the second lens module 2600 and the third lens module 2700 may be disposed on an optical path from the second reflective surface 2312 of the reflective module 2300 to the image sensor 2500.

In an embodiment, the second lens module 2600 and the third lens module 2700 may each be configured to move with respect to the housing 2100 in a predetermined range. In an embodiment, a driving unit including a coil and a magnet may be disposed between the first and second lens modules 2600 and 2700 and the housing 2100.

The lens modules 2600 and 2700 may include magnets 2610 and 2710, respectively, on one side thereof, and coils 2810 and 2820 may be disposed in the housing 2100 to oppose the magnets 2610 and 2710, respectively. The lens modules 2600 and 2700 may move with respect to the housing 2100 by electromagnetic interaction between the coils 2810 and 2820 and the magnets 2610 and 2710. The second lens module 2600 and the third lens module 2700 may move in a direction parallel to the optical axis, and accordingly, the size of an image formed on the image sensor 2500 may change. In other words, the zoom magnification may be adjusted.

In an embodiment, the first lens module 2200 may fixed to the housing 2100. In another embodiment, the first lens module 2200 may move in a direction parallel to the optical axis with respect to the housing 2100, and, in this case, a driving unit including the magnets 2610 and 2710 and the coils 2810 and 2820 may be provided between the first lens module 2200 and the housing 2100.

In an embodiment, the third lens module 2700 may be fixed to the housing 2100. In this case, the magnet 2710 and the coil 2820 illustrated in FIG. 11 may not be provided. For example, the first lens module 2200 and the third lens module 2700 may be fixed, and the second lens module 2600 and the reflective module 2300 may move in a direction parallel to the optical axis (the optical axis of the second lens module 2600). In this case, an autofocusing function may be performed by the movement of the reflective module 2300, and a zoom magnification adjustment function may be performed by the movement of the second lens module 2600.

According to the embodiments disclosed herein, a camera module may provide a high zoom magnification and may also have a small-sized actuator. Also, a camera module may provide a high zoom magnification and may also include an optical image stabilization function or an autofocusing function, thereby providing an image of high quality.

While specific examples have been illustrated and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
a first lens module disposed in a housing;
a reflective module including:
   a reflective member including at least two reflective surfaces disposed at different angles and configured to reflect light passing through the first lens module; and
   a carrier disposed between the reflective member and the housing; and
an image sensor configured to collect light reflected from the reflective module,
wherein the reflective member is configured to move in a first direction, parallel to an optical axis of the first lens module, with respect to the carrier, and
the carrier is configured to move in a second direction perpendicular to the first direction with respect to the housing.

2. The camera module of claim 1, wherein the at least two reflective surfaces include a first reflective surface and a second reflective surface forming a 90-degree angle with the first reflective surface, and the light passing through the first lens module is sequentially reflected from the first reflective surface and the second reflective surface, and is incident to the image sensor.

3. The camera module of claim 2, wherein the second reflective surface forms a 45-degree angle with an imaging surface of the image sensor.

4. The camera module of 1, wherein the second direction is perpendicular to the optical axis of the first lens module.

5. The camera module of claim 1, further comprising:
a ball member disposed between the carrier and the reflective member,
wherein either one or both of the carrier and the reflective member includes a groove extending in the first direction and partially accommodating the ball member in portions opposing each other.

6. The camera module of claim 5, further comprising:
a first magnet disposed on one side of the reflective member; and
a first yoke disposed in the housing to oppose the first magnet,
wherein the ball member maintains contact with each of the carrier and the reflective member by magnetic attractive force between the first magnet and the first yoke.

7. The camera module of claim 6, further comprising:
a first coil opposing the first magnet.

8. The camera module of claim 1, further comprising:
a ball member disposed between the carrier and the housing,
   wherein either one or both of the carrier and the housing includes a groove extending in the second direction and partially accommodating the ball member in portions opposing each other.

9. The camera module of claim 8, further comprising:
a second magnet disposed on one side of the carrier; and
a second yoke disposed in the housing to oppose the second magnet,
   wherein the ball member maintains contact with each of the carrier and the housing by magnetic attractive force between the second magnet and the second yoke.

10. The camera module of claim 9, further comprising:
a second coil opposing the second magnet.

11. The camera module of claim 1, further comprising:
a folded module including a second reflective member configured to reflect incident light to the first lens module.

12. The camera module of claim 11, wherein the folded module is configured to rotate around a rotation axis perpendicular to the optical axis of the first lens module.

13. The camera module of claim 12, wherein either one of the first direction and the second direction is parallel to the optical axis of the first lens module, and the other one of the first direction and the second direction is parallel to a rotation axis of the folded module.

14. The camera module of claim 1, further comprising:
a second lens module disposed on an optical path from the reflective module to the image sensor, and configured to move in a section between the reflective module and the image sensor with respect to the housing.

15. A camera module, comprising:
a first lens module disposed in a housing;
a reflective module including:
   a reflective member including at least two reflective surfaces disposed at different angles and configured to reflect light passing through the first lens module; and
   a carrier disposed between the reflective member and the housing;
an image sensor configured to collect light reflected from the reflective module; and
a second lens module disposed on an optical path from the reflective module to the image sensor, and configured to move in a section between the reflective module and the image sensor with respect to the housing,
wherein the reflective member is configured to move in a first direction with respect to the carrier, and
the carrier is configured to move in a second direction perpendicular to the first direction with respect to the housing.

16. A camera module, comprising:
a lens module disposed in a housing;
a reflective module disposed in the housing to be movable in a first direction and a second direction intersecting the first direction, the reflective module including a reflective member including at least two reflective surfaces disposed at different angles and configured to reflect light passing through the lens module;
ball members disposed between the reflective member and the housing, and supporting movement of the reflective member in the first direction and movement of the reflective member in the second direction; and
an image sensor configured to collect light reflected from the reflective module,
wherein the first direction is parallel to an optical axis of the lens module.

17. The camera module of claim 16, wherein the camera module is configured to perform a focusing operation through movement of the reflective member in the first direction, and perform optical image stabilization through the movement of the carrier in the second direction.

18. A camera module, comprising:
a lens module disposed in a housing; and
a first reflective module comprising:
- a carrier disposed in the housing; and
- a reflective member disposed on the carrier, and including a first reflective surface configured to reflect light that has passed through the lens module, and a second reflective surface configured to reflect light reflected from the first reflective surface toward an image sensor, wherein the reflective member is configured to move in a first direction with respect to the carrier, and move together with the carrier in a second direction perpendicular to the first direction with respect to the housing, and wherein the first direction is parallel to an optical axis of the lens module.

19. The camera module of claim 18, further comprising:
a first ball member disposed between the carrier and the reflective member, and configured to support movement of the reflective member with respect to the carrier; and
a second ball member disposed between the housing and the carrier, and configured to support movement of the carrier with respect to the housing.

20. The camera module of claim 18, further comprising a second reflective module configured to rotate about an axis parallel to the second direction, and reflect incident light toward the lens module.

* * * * *